United States Patent [19]
Gutwein et al.

[11] Patent Number: 5,939,121
[45] Date of Patent: Aug. 17, 1999

[54] PROCESS OF MAKING A FAST ROASTED COFFEE PROVIDING INCREASED BREW STRENGTH AND DARKER CUP COLOR WITH DESIRABLE BREW ACIDITY

[75] Inventors: Roger William Gutwein; Steven Jacob Kirkpatrick, both of Cincinnati, Ohio

[73] Assignee: The Procter & Gamble Company, Cincinnati, Ohio

[21] Appl. No.: 08/932,971

[22] Filed: Sep. 18, 1997

Related U.S. Application Data

[62] Division of application No. 08/515,554, Aug. 16, 1995, Pat. No. 5,721,005.

[51] Int. Cl.$^6$ .............................. A23B 4/03; A23F 5/00
[52] U.S. Cl. ..................... 426/466; 426/468; 426/473; 426/595
[58] Field of Search ................. 426/466, 595.4, 426/467, 468, 469, 473

[56] References Cited

U.S. PATENT DOCUMENTS

| | | | |
|---|---|---|---|
| 3,122,439 | 2/1964 | MacAllister et al. | 99/68 |
| 3,610,540 | 10/1971 | Krolopp et al. | 241/2 |
| 3,615,667 | 10/1971 | Joffe | 99/68 |
| 3,660,106 | 5/1972 | McSwiggin et al. | 99/65 |
| 3,762,930 | 10/1973 | Mahlmann | 99/68 |
| 3,769,031 | 10/1973 | McSwiggin | 426/148 |
| 4,110,485 | 8/1978 | Grubbs et al. | 426/595 |
| 4,188,409 | 2/1980 | Kay | 426/78 |
| 4,267,200 | 5/1981 | Klein et al. | 426/595 |
| 4,331,696 | 5/1982 | Bruce, III | 426/595 |
| 4,428,535 | 1/1984 | Venetucci | 241/35 |
| 4,484,064 | 11/1984 | Murray | 219/400 |
| 4,501,761 | 2/1985 | Mahlmann et al. | 426/467 |
| 4,540,591 | 9/1985 | Dar et al. | 426/388 |
| 4,591,508 | 5/1986 | Pultinas, Jr. | 426/595 |
| 4,637,935 | 1/1987 | Kirkpatrick et al. | 426/443 |
| 4,683,666 | 8/1987 | Igusa et al. | 34/67 |
| 4,919,962 | 4/1990 | Arora et al. | 426/594 |
| 4,988,590 | 1/1991 | Price et al. | 426/595 |
| 5,019,413 | 5/1991 | Becker et al. | 426/460 |
| 5,064,676 | 11/1991 | Gore | 426/595 |
| 5,068,979 | 12/1991 | Wireman et al. | 34/58 |
| 5,155,923 | 10/1992 | Wireman et al. | 34/8 |
| 5,160,757 | 11/1992 | Kirkpatrick et al. | 426/595 |
| 5,185,171 | 2/1993 | Bersten | 426/467 |
| 5,227,188 | 7/1993 | Leppla et al. | 426/595 |
| 5,257,574 | 11/1993 | Hiromichi | 99/483 |
| 5,269,072 | 12/1993 | Waligorski | 34/57 |
| 5,287,633 | 2/1994 | Sachs | 34/13 |
| 5,292,005 | 3/1994 | Wireman et al. | 209/144 |
| 5,322,703 | 6/1994 | Jensen et al. | 426/595 |

FOREIGN PATENT DOCUMENTS

| | | |
|---|---|---|
| 914999 | 11/1972 | Canada. |
| 929789 | 7/1973 | Canada. |
| 989246 | 5/1976 | Canada. |
| 1088366 | 10/1980 | Canada. |
| 0 132 877 | 11/1984 | European Pat. Off.. |
| 0 405 649 A2 | 6/1989 | European Pat. Off.. |

*Primary Examiner*—Anthony J. Weier
*Attorney, Agent, or Firm*—Karen F. Clark; Jacobus C. Rasser

[57] ABSTRACT

Roast and ground or flaked coffee products which provide more brew strength and cup color at lower levels of brews solids. These coffee products include darker fasted roasted coffee that is predominantly high acidity-type coffee that provide, when brewed appropriate conditions, a consumable coffee beverage having:

(1) a brew solids level of from about 0.4 to about 0.6%;

(2) a Titratable Acidity of at least about 1.52;

(3) a brew absorbance of at least about 1.25, provided that when the Titratable Acidity is in the range of from about 1.52 to about 2.0, the brew absorbance is equal to or greater than the value defined by the equation:

$$1.25+[0.625\times(2.0-TA)]$$

where TA is the Titratable Acidity.

13 Claims, No Drawings

PROCESS OF MAKING A FAST ROASTED COFFEE PROVIDING INCREASED BREW STRENGTH AND DARKER CUP COLOR WITH DESIRABLE BREW ACIDITY

This is a division of application Ser. No. 08/515,554, filed on Aug. 16, 1995 now U.S. Pat. No. 5,721,005.

FIELD OF THE INVENTION

This application relates to roast and ground and flaked coffee products that have been fast roasted. This application particularly relates to fast roasted coffees that provide a darker cup color and improved flavor strength, yet with a desirable level of brew acidity.

BACKGROUND OF THE INVENTION

Historically roast and ground coffee has been marketed on supermarket shelves by weight in 16-ounce cans. However, a recent trend in the coffee market has resulted in the demise of the 16-ounce weight standard. This trend emerged in 1988, when major coffee manufacturers began marketing 13-ounce blends. The blends were prepared using "fast roast" technology that resulted in a lower density bean. Thirteen ounces of these lower density blends have nearly the same volume as the traditional 16-ounce blends. As a result they could be marketed in the old 1-pound cans and were priced about 20 cents below the previous 16-ounce list price because they used fewer beans. This down-weighting of coffee in cans has met with widespread acceptance in the industry.

One process using fast roasting to lower bean density is disclosed in U.S. Pat. No. 5,160,757 (Kirkpatrick et al), issued Nov. 3, 1992. In the Kirkpatrick et al process, the green coffee beans are pre-dried to a moisture content of from about 0.5% to about 10% by weight, fast roasted to a Hunter L-color of from about 14 to about 25 and a Hunter AL-color of less than about 1.2, and then ground, or ground and flaked. The resulting coffee product has a tamped bulk density of from about 0.28 to about 0.38 g/cc and is more uniformly roasted compared to traditional reduced density coffee beans. See abstract and column 2, lines 35–45.

Many recent "fast roast" coffees also have a higher yield of brew solids than previous 16-ounce coffees. These high yield fast roast and ground coffees exhibit improved extraction characteristics during brewing. Higher yield (sometimes referred to as higher mileage) coffees have typically been defined by the ability to extract more brew solids from the coffee beans so that an equivalent brew solids is achieved in the final brew but with less coffee used. In other words, these higher yield coffees can make more cups of coffee per ounce when compared to previous 16-ounce coffees.

Fast roasting results in a puffed or somewhat popped bean. Fast roasting of coffee typically occurs in large multistage roasters (e.g., Probat, Thermalo, Jetzone, etc.) with very large heat inputs. These high heat inputs result in the rapid expansion of the roasted bean, but can also cause a high degree of bean roasting variation within the roaster. In addition, tipping and burning of the outer edges of the bean can be a major problem during fast roasting.

One proposed solution for dealing with problems caused by fast roasting, including tipping and burning, is disclosed in U.S. Pat. No. 5,322,703 (Jensen et al), issued Jun. 21, 1994. In the Jensen et al process, green coffee beans are dried prior to roasting to a moisture content of from about 0.5 to about 7%. These predried beans are then fast roasted to a Hunter L-color of from about 10 to about 16. These dried dark roasted coffee beans (about 1 to about 50%) are blended with non-dried roasted coffee beans (about 50 to about 99%), and then ground, or ground and flaked. See abstract and column 1, lines 50–63.

The purpose in predrying according to the Kirkpatrick et al and Jensen et al processes is to make the moisture content of the resultant predried more uniform throughout. See column 3, lines 52–56 of Kirkpartrick et al. While predrying improves the flavor of all coffees, it particularly improves the flavor of lower grade coffees such as the Robustas. See column 8, lines 4547. See also column 3, lines 13–15 of Jensen et al (dark roasting of non-dried coffee beans, especially low quality beans such as Robustas can result in excessive burnt-rubbery notes.)

As alluded to in Jensen et al, a major problem with prior high yield coffees is their unbalanced flavor and lack of acidity. See column 1, lines 42–44 (enhancing extractability and brew coffee yield can be achieved but often at the expense of balanced flavor of the coffee brew). The Jensen et al process tried to improve this balance by blending the dark roasted pre-dried beans (providing strength with minimal burnt-rubbery flavor notes) with the lighter roasted non-dried coffees (to provide flavor and acidity). See column 1, line 64–68. This blending does result in higher acidity, but at the expense of diluting the high yield benefits of the pre-dried beans.

Historically, coffee brew strength, as well as cup color, has been directly correlated to the level of brew solids present the brewed cup of coffee. To achieve increased brew strength and cup color, the coffee beans have previously been roasted faster, darker and with greater concentrations Robustas. Grinding the beans finer and flaking the ground beans thinner have also been used to increase brew strength and cup color. This often leads to undesired tipping and burning of the beans, along with harsh, rubbery notes (from the Robustas) in the brewed coffee. Coffee made this way also generally leads to a lack of desired acidity in the brewed coffee.

Accordingly, it would be desirable to have a high yield roast and ground or flaked coffee product that provides a coffee beverage having: (1) a darker cup color; (2) increased brew strength; (3) yet with a desirable level of acidity

DISCLOSURE OF THE INVENTION

The present invention relates to a roast and ground or flaked coffee product which provides more brew strength and cup color, yet with a desirable level of brew acidity. This coffee product has a Hunter L-color of from about 13 to about 19 and comprises from about 50 to 100% high acidity-type coffee, from 0 to about 30% low acidity-type coffee, and from 0 to about 50% moderate acidity-type coffee. This coffee product, when brewed under appropriate conditions, is capable of providing a consumable coffee beverage having:

(1) a brew solids level of from about 0.4 to about 0.6%;
(2) a Titratable Acidity of at least about 1.52;
(3) a brew absorbance of at least about 1.25, provided that when the Titratable Acidity is in the range of from about 1.52 to about 2.0, said brew absorbance being equal to or greater than the value defined by the equation:

$$1.25 + [0.625 \times (2.0 - TA)]$$

where TA is the Titratable Acidity.

The present invention further relates to a process for preparing these roast and ground or flaked coffee products. This process comprises the steps of:

(a) fast roasting green coffee beans comprising from about 50 to 100% high acidity-type coffee beans, from 0 to about 30% low acidity-type coffee beans and from 0 to about 50 moderate acidity-type coffee beans that have not been predried, or only partially predried, to a Hunter L-color of from about 13 to about 19 under conditions that prevent burning and tipping of the beans;

(b) grinding the roasted coffee beans;

(c) optionally flaking the ground coffee beans.

Coffee products of the present invention perform across a wide range of brewers delivering a high quality beverage with desirable strength and cup color at a drastically reduced usage. These products are believed to have increased brew absorbance due to the formation (during fast roasting) and extraction of very large molecules (e.g., polysaccharides) from the coffee. What was previously unknown was how to make and extract these molecules using higher quality coffees and still maintain the desired higher acidity. What has been surprisingly discovered is that by careful fast roasting, even high quality washed Arabicas can be fast roasted to darker colors without burning. Careful fast roasting of these higher acidity-type Arabica beans produces the desired absorbance compounds, and sufficiently puffs the beans to allow extraction of these desired compounds. Subsequent mechanical disruption of the beans and cells (grinding and/or flaking) is also key in extracting these absorbance compounds to provide a consumable coffee beverage have the desired brew strength and cup color.

DETAILED DESCRIPTION OF THE INVENTION

A. Definitions

As used herein, the term "density" means bulk density. Density or bulk density values herein can be measured by conventional means as tamped bulk density values.

As used herein, "brew solids" refer to brew solids in a coffee brew obtained under standard brewing conditions (as described hereafter in the Analytical Methods section) using one ounce of a roasted and ground or flaked coffee product in a Bunn OL-35 automatic drip coffee maker with a water feed of 1860 ml at 195° F. (90° C.).

As used herein, the term "1-pound coffee can" relates to a coffee container which has a volume of 1000 cc. Historically, one pound (16 oz.) of coffee was sold in this volume container.

All particle screens referred to herein are based on the U.S. Standard Sieve Screen Series or on the average particle size in microns ($\mu$m) as measured by Laser Diffraction on a Sympatec Rodos Helos laser particle size analyzer.

As used herein, the term "comprising" means that the various coffees, other ingredients, or steps, can be conjointly employed in practicing the present invention. Accordingly, the term "comprising" encompasses the more restrictive terms "consisting essentially of" and "consisting of."

All ratios and percentages herein are based on weight unless otherwise specified.

B. Types and Grades of Coffee

Coffee beans useful in the present invention can be either of a single type or grade of bean or can be formed from blends of various bean types or grades, and can be undecaffeinated or decaffeinated. In order to provide the desired acidity in the coffee beverage, the coffee beans useful in the present invention are predominantly high acidity-type beans in amounts of from about 50 to 100%, preferably from about 70 to 100% and most preferably from about 90 to 100%. As used herein, "high acidity-type beans" are defined as beans that deliver greater than about 1.9 Titratable Acidity. These high acidity-type beans are typically referred to as high grade coffees. Suitable high grade coffee having high acidity include Arabicas and Colombians characterized as having "excellent body," "acid," "fragrant," "aromatic" and occasionally "chocolatey." Examples of typical high quality coffees are "Milds" often referred to as high grade Arabicas, and include among others Colombians, Mexicans, and other washed Milds such as strictly hard bean Costa Rica, Kenyas A and B, and strictly hard bean Guatemalans.

Coffees useful in the present invention can also include from 0 to about 50%, preferably from 0 to about 30% and most preferably from 0 to about 10% moderate acidity-type coffee beans. As used herein, "moderate acidity-type beans" are defined as beans that deliver between about 1.7 and 1.9 titratable acidity as defined in the Analytical Methods section. These moderate acidity-type beans are typically referred to as intermediate grade coffees. Suitable intermediate quality coffees are the Brazilian coffees such as Santos and Paranas, African Naturals, and Brazils free from the strong Rioy flavor such as good quality Suldeminas. Intermediate coffees are characterized as having bland, neutral flavor and aroma, lacking in aromatic and high notes, and are generally thought to be sweet and non-offensive.

Coffees useful in the present invention can also include from 0 to about 30%, preferably from 0 to about 20% and most preferable from 0 to about 10% low acidity-type coffee beans. As used herein, "low acidity-type beans" are defined as beans that deliver less than about 1.7 titratable acidity as defined in the Analytical Methods section. These low acidity-type beans are typically referred to as low grade coffees. Suitable low grade coffees having low acidity include Robustas, or low acidity natural Arabicas. These low grade coffees are generally described as having rubbery flavor notes and produce brews with strong distinctive natural flavor characteristics often noted as bitter.

C. Roasting Coffee Beans

Prior to roasting, the coffee beans can be partially predried to a moisture content of from about 3 to about 7%, preferably from about 5 to about 7%. Partial predrying can be desirable where a higher proportion of moderate to low acidity-type coffees are used make the moisture more uniform and thus less susceptible to tipping and burning. Partial predrying can be carried out according to any of the methods disclosed in U.S. Pat. No. 5,160,757 (Kirkpatrick et al), issued Nov. 3, 1992 or U.S. Pat. No. 5,322,703 (Jensen et al), issued Jun. 21, 1994, both of which are incorporated by reference to provide the indicated moisture content values. Preferably, the coffee beans are not predried prior to roasting and typically have moisture contents in the range of from about 8 to 14%.

The coffee beans are carefully roasted under conditions that avoid tipping and burning of the beans. As used herein, the terms "tipping" and "burning" relate to the charring of the ends and outer edges of a bean during roasting. Tipping and burning of beans results in a burnt flavor in the resulting brewed beverage. Tipping and burning can be avoided by the combination of using high quality beans with minimal defects, roasting similar sizes and types together, uniform heat transfer (preferably convective), and controlling the heat input rate through the roast to prevent the edges of the beans from burning.

In order to achieve the desired darker roast color without tipping or burning, the coffee beans are fast roasted in the process of the present invention. Fast roasters suitable for use in the present invention can utilize any method of heat transfer. However, convective heat transfer is preferred, with forced convection being most preferred. The convective media can be an inert gas or, preferably, air. Typically, the pre-dried beans are charged to a bubbling bed or fluidized bed roaster where a hot air stream is contacted with the bean. Suitable roasters capable of forming a fluidized bed of green coffee beans include the Jetzone RTM. roaster manufacture by Wolverine (U.S.), the Probat RTM. roaster manufactured by Probat-Werke (Germany), the Probat RT or RZ. roaster manufactured by Probat-Werke (Germany), the Burns System 90 roaster by Burns (Buffalo, N.Y.), the HYC roaster by Scolari Engineering (Italy), and the Neotec RFB by Neotec (Germany). Any other roasting equipment which causes a rapid heating of the bean such as that achieved through fluidization can be used.

Roasting equipment and methods suitable for roasting coffee beans according to the present invention are described, for example, in Sivetz, Coffee Technology, Avi Publishing Company, Westport, Conn. 1979, pp. 226–246, incorporated herein by reference. See also U.S. Pat. No. 3,964,175 (Sivetz) issued Jun. 22, 1976, which discloses a method for fluidized bed roasting of coffee beans.

Other fast roasting methods useful in present invention are described in U.S. Pat. No. 5,160,757 (Kirkpatrick et al), issued Nov. 3, 1992; U.S. Pat. No. 4,737,376 (Brandlein et al.), issued Apr. 12, 1988; U.S. Pat. No. 4,169,164 (Hubbard et al.), issued Sep. 25, 1979; and U.S. Pat. No. 4,322,447 (Hubbard), issued Mar. 30, 1982, all of which are incorporated by reference.

In the process of the present invention, the green coffee beans are fast roasted in from about 10 seconds to about 5.5 minutes, preferably in from about 1 to about 3 minutes, using air or another fluidizing heat exchange medium having a temperature of from about 350° F. (177° C.) to about 1200° F. (649° C.), preferably a temperature of from about 400° F. (240° C.) to about 800° F. (427° C.). The green coffee are fast roasted to an average color of from about 13 to about 19 Hunter "Hunter" units, preferably from about 14 to about 18 Hunter "L" units, and most preferably from about 15 to about 17 Hunter "L" units. The Hunter Color "L" scale system is generally used to define the color of the coffee beans and the degree to which they have been roasted. Hunter Color "L" scale values are units of light reflectance measurement, and the higher the value is, the lighter the color is since a lighter colored material reflects more light. Thus, in measuring degrees of roast, the lower the "L" scale value the greater the degree of roast, since the greater the degree of roast, the darker is the color of the roasted bean. This roast color is usually measured on the roasted, quenched and cooled coffee beans prior to subsequent processing (e.g., grinding and/or flaking) into a finished coffee product.

As soon as the desired roast bean color is reached, the beans are removed from the heated gases and promptly cooled, typically by ambient air and/or a water spray. Cooling of the beans stops the roast-related pyrolysis reactions. Water spray cooling, also known as "quenching," is the preferred cooling method in the present invention. The amount of water sprayed is carefully regulated so that most of the water evaporates off. The roasted and quenched beans are further cooled with air.

After cooling, the roast coffee beans of the present invention have a whole roast tamped bulk density of from about 0.27 to about 0.38 g/cc, preferably from about 0.29 to about 0.36 g/cc, more preferably from about 0.30 to about 0.36 g/cc, and most preferably from about 0.30 to about 0.35 g/cc.

D. Grinding Roasted Beans

The roasted coffee beans can then be ground using any conventional coffee grinder. Depending upon the specific particle size distribution desired in the final product of the present invention, the coffee fractions can be ground to the particle size distributions or "grind sizes" traditionally referred to as "regular," "drip," or "fine" grinds. For example, automatic drip coffee grinds typically have an average particle size of about 900 $\mu$m and percolator grinds are typically from about 1500 $\mu$m to about 2200 $\mu$m. The standards of these grinds as suggested in the 1948 Simplified Practice Recommendation by the U.S. Department of Commerce (see Coffee Brewing Workshop Manual, page 33, published by the Coffee Brewing Center of the Pan American Bureau) are as follows:

| Grind | Sieve (Tyler) | Wt. % |
|---|---|---|
| Regular | on 14-mesh | 33 |
|  | on 28-mesh | 55 |
|  | through 38-mesh | 12 |
| Drip | on 28-mesh | 73 |
|  | through 28-mesh | 27 |
| Fine | through 14-mesh | 100 |
|  | on 28-mesh | 70 |
|  | through 28-mesh | 30 |

Typical grinding equipment and methods for grinding roasted coffee beans are described, for example, in Sivetz & Foote, "Coffee Processing Technology," Avi Publishing Company, Westport, Conn., 1963, Vol. 1, pp. 239–250.

E. Flaking Roast and Ground Coffee

Coffee products according to the present invention can be flaked. Preferred flaked products are produced by grinding the roast coffee to an average particle size from about 300 to about 3000 $\mu$m, normalizing the ground product, and then milling the coffee to a flake thickness of from about 2 to about 40 thousandths of an inch (about 51 to about 1016 $\mu$m), preferably from about 5 to about 30 (about 127 to about 762 $\mu$m), most preferably from about 5 to about 20 (about 127 to about 508 $\mu$m). Suitable methods and apparatus for flaking are disclosed in, for example, U.S. Pat. No. 3,615,667 (Joffe), issued Oct. 26, 1971; U.S. Pat. No. 3,660,106 (McSwiggin et al), issued May 2, 1972; U.S. Pat. No. 3,769,031 (McSwiggin), issued Oct. 30, 1973; U.S. Pat. No. 4,110,485 (Grubbs et al), issued Aug. 29, 1978; and 5,064,676 (Gore), issued -Nov. 12, 1991, all of which are incorporated by reference.

F. Characteristics of Beverage Obtained by Brewing Roast and Ground or Flaked Coffee Product 1. Brew and Titratable Acidity An important characteristic of coffee beverages prepared from roast and ground or flaked coffee products according to the present invention is brew acidity. A high quality coffee brew is typically noted for its acidity. Coffee brews having high acidity are typically obtained from high quality beans. The problem previously with high yield, high mileage coffees is the use of less coffee (dilution), darker roasting (which tends to decrease acidity) and the use of stronger flavored Robustas (which generally have less acidity).

Therefore, higher acidity becomes vital in maintaining a high quality brew for high mileage coffees.

The ability of coffee to buffer pH changes in the mouth is its main indicator of acidity perception. This buffering capability can be measured by titrating the brew to pH 7 with sodium hydroxide and is thus referred to as Titratable Acidity (TA). Coffee beverages prepared from roast and ground or flaked coffee products according to the present invention have a TA of at least about 1.52, with a typical range of from about 1.6 to about 3.0. Preferably, these coffee products have a TA of at least about 1.58, with a typical range of from about 1.8 to about 2.7.

2. Cup Color and Brew Absorbance

Another important characteristic of coffee beverages prepared from roast and ground or flaked coffee products according to the present invention is cup color. A dark cup of coffee is the first thing that a coffee drinker typically looks for. The coffee drinker will initially look at the cup of coffee to visually judge its strength. If the cup is too clear and allows light to transmit through it, it is usually considered too weak. However, if the brew in the cup is too dark so that virtually no light can transmit through it, it is usually considered too strong.

Before ever tasting the coffee, the coffee drinker has thus judged in their mind as to what the strength will be, and by tasting it, confirms through taste what they have already visually seen. Therefore, an adequately strong cup of coffee must first visually look dark. Second, with the lower usage's of high yield, high mileage coffees, the consumer is constantly skeptical of the coffee being weak. Therefore, especially for high mileage coffees, the brew must be dark to prevent it from being judged weak.

Traditionally, the darker the cup of coffee, the stronger it is. This observation is true of high mileage coffees. Except for the formation of offensive flavors (burnt, rubbery, rioy), the darkness of the cup almost always correlates with the strength. Therefore, by measuring and controlling the cup darkness, one can not only predict the visual response to cup darkness, but can also somewhat predict its true strength (assume no offensive flavors).

To technically measure the darkness of the coffee brew, a spectrophotometer is used to measure the amount of light absorbance by the liquid brewed coffee. A wavelength of 480 nanometers (nm) was chosen because it corresponds with the Brown Color absorbance on the visible spectrum. (Brown color is typically associated with stronger coffee brews.) This absorbance at 480 nm correlates with the visually perceived darkness in the cup.

For coffee beverages prepared from roast and ground or flaked coffee products according to the present invention have a brew absorbance of at least about 1.25, with a typical range of from about 1.3 to about 1.9. However, when the coffee beverage has a Titratable Acidity (TA) in the range of from about 1.52 to about 2.0, this brew absorbance is equal to or greater than the value defined by the equation:

$$1.25 + [0.625 \times (2.0 - TA)].$$

Preferably, when the coffee beverage has a TA in the range of from about 1.58 to about 2.2, this brew absorbance is equal to or greater than the value defined by the equation:

$$1.25 + [0.625 \times (2.2 - TA)].$$

3. Brew Solids

Another important characteristic of coffee beverages prepared from roast and ground or flaked coffee products according to the present invention is the level of brew solids. Brew solids are simply the solids remaining after oven drying the brewed coffee. Brew solids is an indication of the mass transfer that has occurred from the solid grounds to the water phase during brewing. While the level of brew solids is a good indicator of the efficiency of the extraction and completeness, it does not discriminate as to what compounds are extracted. Indeed, green coffee has a considerable fraction of extractable brew solids, even though the subsequent brew prepared from this green coffee lacks coffee flavor.

High yield, high mileage coffees have concentrated on extracting more of the available brew solids. This has been beneficial in providing good extraction of the majority of the compounds that are low molecular weight (i.e., simple sugars). However, until the present invention, very little attention has been paid to studying how to make and extract more of the strength compounds.

It is believed that the compounds that contribute to the additional strength and cup darkness of coffee beverages prepared from roast and ground or flaked coffee products according to the present invention is due to very high molecular weight molecules such as polysaccharides. These compounds may not be at very high levels, but are very functional because of their size, geometry and full chemical structure. The low level of these very functional molecules can be almost insignificant when compared to the total brew solids.

Although the level of brew solids is an incomplete measurement of brew strength, it is still a good indicator of overall extraction efficiency. Accordingly, coffee products according to the present invention maintain a high extraction efficiency, as measured by brew solids. For coffee beverages prepared from roast and ground or flaked coffee products according to the present invention, the level of brew solids is in the range of from about 0.4 to about 0.6%. Preferably, coffee beverages prepared from coffee products according to the present invention have a level of brew solids in the range of from about 0.42 to about 0.58%.

4. Relationship of Brew Absorbance to Roast Color of Coffee

Another important characteristic of roast and ground or flaked coffee products according to the present invention is the relationship of brew absorbance to roast color. There is a natural tendency as the coffee is roasted darker for it to produce more of the strength and color compounds. Coffee products according to the present invention provides coffee beverages having an increased brew absorbance at a given degree of roast color. This can be quantified by the relationship of the brew absorbance of the coffee beverage produced from the coffee product relative the roast color of the coffee product. Coffee products according to the present invention preferably have a brew absorbance equal to or greater than the value defined by the equation:

$$2.475 - [0.075 \times (\text{Hunter L-color of coffee})]$$

G. Analytical Methods

1. Whole Roast Tamped Bulk Density Determination

This method determines the degree of puffing that occurs in the roasting of green coffee and is applicable to both decaffeinated and non-decaffeinated whole roasts.

a. Apparatus

Weighing container: 1,000 ml stainless steel beaker or equivalent

Measuring container: 1,000 ml plastic graduated cylinder; 5 ml graduations

Scale: 0.1 gm sensitivity

Vibrator: Syntron Vibrating Jogger; Model J-1 or equivalent. Syntron Company—Homer City, Pa.

Funnel: Plastic funnel with tip cut off to about 1" outlet

Automatic Timer: Electric, Dimco-Gray; Model No. 171 or equivalent b. Operation:

Weigh 200 g of whole bean coffee to be tested into beaker. Place the graduated cylinder on the vibrator. Using the funnel, pour the coffee sample into the cylinder. Level the coffee by gently tapping the side of the cylinder. Vibrate 30 seconds at No. 8 setting. Read volume to nearest 5 ml. Tamped density can be determined by dividing the weight of the coffee by the volume occupied (after vibrating) in the graduated cylinder.

For standardizing the measurements between different coffees, all density measurements herein are on a 4.5% adjusted moisture basis. For example, 200 grams of whole bean coffee having a 2% moisture content would contain 196 g of dry coffee and 4 g of water. If the volume was 600 cc, the unadjusted density would be 200 g/600 cc=0.33 g/cc. On a 4.5% adjusted moisture basis, the calculation is: 4.5%×200 gms=9 gms water. To make the density calculation on an adjusted moisture basis, take 196 g dry coffee+9 g water=205 g total. Adjusted density=205 g/600 cc=0.34 g/cc.

2. Roasted Coffee Color

The Hunter Color "L" scale system is generally used to define the color of the coffee beans and the degree to which they have been roasted. A complete technical description of the system can be found in an article by R. S. Hunter "Photoelectric Color Difference Meter," J. of the Optical Soc. of Amer., 48, 985–95 (1958). In general, it is noted that Hunter Color "L" scale values are units of light reflectance measurement, and the higher the value is, the lighter the color is since a lighter colored material reflects more light. In particular, in the Hunter Color system the "L" scale contains 100 equal units of division; absolute black is at the bottom of the scale (L=0) and absolute white is at the top (L=100). Thus, in measuring degrees of roast, the lower the "L" scale value the greater the degree of roast, since the greater the degree of roast, the darker is the color of the roasted bean.

3 Brewing

Coffee is brewed on a Bunn OL-35 automated drip brewer. Coffee filters are 12 cup oxygen processed Bunn Coffee filters (Reg. 6001). One ounce of coffee is added to the filter in the basket. The brewer is supplied with distilled water and feeds 1860 ml at 195° F. (90° C.) in 146 seconds to the brew basket. Brewed coffee is collected in a carafe and then mixed. Samples for brew solids, brew absorbance, and Titratable Acidity are then collected.

4. Brew Absorbance

The brewed coffee is placed in a 12 ml sealed vial and then cooled for 10 minutes in a water bath at 29 degrees C. The sample is then transferred to a cuvette and the absorbance is measured in a Milton Roy Spectrophotometer 401 at 480 nm wavelength.

5. Brew Solids

The brewed coffee is placed in a 12 ml sealed vial and allowed to cool. The sample is then analyzed for solids content by index of refraction using a Bellingham & Stanley RFM 81, where the sample temperature during the measurement is maintained at 29° C. The readings are correlated with readings of reference solutions of known brew solids content based on oven drying techniques using a correlation of:

Refractive Index=0.001785×(% brew solids)+1.331995

6. Titratable Acidity

From a mixed carafe, 100 g of a coffee brew is collected, covered with a lid, and allowed to cool. The coffee brew is then titrated to 7 pH using 0.1 N sodium hydroxide solution, recording the milliliters required as the Titratable Acidity (ml 0.1 N NaOH).

7. Green Coffee Acidity

To assess the acidity level in green coffee, the coffee is roasted in a standard way, to a standard condition, ground and flaked, brewed and then the Titratable Acidity measured: A 100 pound charge of coffee is fed to a Thermalo roaster, Model Number 23R, manufactured by Jabez Burns and a gas burner input rate of about 1.4 million BTU/hr. such that the coffee is roasted to color of 17 Hunter L in approximately 210 seconds. The coffee is then quenched to 4.5% moisture and cooled. After grinding and subsequent flaking to a 14 mil thickness, the product is brewed (per method 3 above) and the Titratable Acidity is measured (per method 6 above method).

H. EXAMPLES

Example 1

Washed Arabica coffees from Guatemala having a Standard Green Acidity of 2.2 were fast roasted on a batch Thermalo roaster with a 100 pound charge to a roasted bean temperature of 441° F. (227° C.), achieving a roast color of 15.6 Hunter L with a roast time of 226 seconds. The coffee was then quenched to 3.9% moisture and yielded a whole roast density of 0.32 g/cc. The coffee was then ground to an average particle size of 850 µm and then flaked to a 14 mil flake thickness. The product provided a coffee brew with a brew absorbance of 1.72, a Titratable Acidity of 1.77, and brew solids of 0.51%.

Example 2

Washed Arabicas from Colombia having a Standard Green Acidity of 2.7 were fast roasted on a Probat RZ2500SY continuous roaster with a roast time of 120 seconds, a hot air temperature of 635° F. (335° C.), achieving a roast color of 15.9 Hunter L and a whole roast density of 0.36 g/cc. The roasted coffee was quenched to 4.7% moisture and then cooled with air. The cooled beans were than ground to an average particle size of 950 µm and then flaked to a 14 mil flake thickness. The product provided a coffee brew with a brew absorbance of 1.52, a Titratable Acidity of 2.60, and brew solids of 0.49%.

Example 3

A blend of Arabicas from Central and South America having a Standard Green Acidity of 2.4 were fast roasted on a Probat RZ2500SY continuous roaster with a roast time of 120 seconds, a hot air temperature of 675° F. (357° C.), achieving a roast color of 16.7 Hunter L and a whole roast density of 0.34 g/cc. The roasted coffee was quenched to 4.4% moisture and then cooled with air. The cooled beans were than ground to an average particle size of 1000 µm and then flaked to a 14 mil flake thickness. One ounce of the product was added to a filter pack with impermeable side walls. The filter pack coffee product provided a coffee brew with a brew absorbance of 1.44, a Titratable Acidity of 2.39, and brew solids of 0.50%.

Example 4

The whole roasted beans from Example 2 were ground to an average particle size of 900 µm and then flaked to a 10 mil flake thickness. The product provided a coffee brew with a brew absorbance of 1.60, a Titratable Acidity of 2.70, and brew solids of 0.51%.

Example 5

A blend of Decaffeinated Washed Arabicas from Central America and Colombia having a Standard Green Acidity of 2.35 were fast roasted on a Probat RZ2500SY continuous roaster with a roast time of 120 seconds, a hot air temperature of 607° F. (319° C.), achieving a roast color of 15.9 Hunter L and a whole roast density of 0.36 g/cc. The roasted coffee was quenched to 4.5% moisture and then cooled with air. The cooled beans were than ground to an average particle size of 1025 pm and then flaked to a 14 mil flake thickness. The product provided a coffee brew with a brew absorbance of 1.42, a Titratable Acidity of 2.30, and brew solids of 0.44%.

Example 6

The whole roasted beans from Example 1 were blended with whole roasted beans from Example 2 in a weight ratio of 70:30. This bean blend was then ground to an average particle size of 900 μm and then flaked to a 14 mil flake thickness. The product provided a coffee brew with a brew absorbance of 1.67, a Titratable Acidity of 2.02, and brew solids of 0.50%.

Example 7

The whole roasted beans from Example 2 were ground to an average particle size of 390 μm. The product provided a coffee brew with a brew absorbance of 1.52, a Titratable Acidity of 2.50, and brew solids of 0.46%.

Example 8

Natural Robustas from Uganda having a Standard Green Acidity of 1.63 were fast roasted on a batch Thermalo roaster with a 100 pound charge to a roasted bean temperature of 448° F. (231° C.), achieving a roast color of 15.3 Hunter L with a roast time of 219 seconds. The coffee was then quenched to 4.0% moisture and yielded a whole roast density of 0.34 g/cc. This whole roast was then ground to an average particle size of 400 μm. This ground product was then blended with the flaked coffee from Example 4 in weight ratio of 5:95. (At the 5:95 ratio, the equivalent Standard Green Acidity for the total blend was 2.6.) The blended product provided a coffee brew with a brew absorbance of 1.77, a Titratable Acidity of 1.89, and brew solids of 0.50%.

Example 9

The ground coffee from Example 7 was blended with flaked coffee from Example 1 in a weight ratio of 50:50. The product provided a coffee brew with a brew absorbance of 1.67, a Titratable Acidity of 2.15, and brew solids of 0.47%.

Example 10

The flaked coffee from Example 4 was brewed using a standard brew set up, except that the brewer was modified so that only 750 ml of water was added in 85 seconds to the brew basket. The resultant brew resembled an "espresso" style coffee beverage which could be used for Cappuccinos, Lattes, etc. Also, this concentrated brew was diluted with 1100 ml of hot distilled water to a final normal brew volume of 1800 ml which provided a coffee brew with a brew absorbance of 1.38, a Titratable Acidity of 2.38, and brew solids of 0.45%. In addition, the amount of water added to the brewer was varied from 400 to 1200 ml to change the strength of the "espresso" style coffee beverage. Also, the coffee weight added to the brew basket was varied from 1 to 3 ounces to change the strength of the "espresso" style coffee beverage. Also, the equivalent amount of water added to dilute the coffee was varied from 300 to 2000 ml to deliver a range of coffee strengths from "very strong," "strong," "medium," "mild," to "very mild."

What is claimed is:

1. A process for preparing a roast and ground or flaked coffee product capable of providing a consumable coffee beverage having:
   (1) a brew solids level of from about 0.4 to about 0.6%;
   (2) a Titratable Acidity of at least about 1.52;
   (3) a brew absorbance of at least about 1.25, provided that when the Titratable Acidity is in the range of from about 1.52 to about 2.0, the brew absorbance is equal to or greater than the value defined by the equation:

$$1.25+[0.625\times(2.0-TA)]$$

wherein TA is the Titratable Acidity;
said process comprising the steps of:
   (a) fast roasting green coffee beans comprising from about 50 to 100% high acidity-type coffee beans, from 0 to about 30% low acidity-type coffee beans and from 0 to about 50 moderate acidity-type coffee beans that have not been predried, or only partially predried, to a Hunter L-color of from about 13 to about 19 under conditions that prevent burning and tipping of the beans;
   (b) grinding the roasted coffee beans;
   (c) optionally flaking the ground coffee beans.

2. A process of claim 1 wherein the green coffee beans are fast roasted in from about 10 seconds to about 5.5 minutes at a temperature of from about 350° F. (177° C.) to about 1200° F. (649° C.).

3. A process of claims 2 wherein the green coffee beans are roasted in from about 1 to about 3 minutes at a temperature of from about 400° F. (240° C.) to about 800° F. (427° C.).

4. A process of claim 2 wherein the green coffee beans comprises from about 70 to 100% high acidity-type coffee beans, from 0 to about 20% low acidity-type coffee beans, and from 0 to about 30% moderate acidity-type coffee beans.

5. A process of claim 2 wherein the green coffee beans comprises about 90 to 100% high acidity-type coffee beans, from 0 to about 10% low acidity-type coffee beans, and from 0 to about 100% moderate acidity-type coffee beans.

6. A process of claim 2 wherein the green coffee beans are roasted to a Hunter L-color of from about 14 to about 18.

7. A process of claim 3 wherein the green coffee beans are roasted to a Hunter L-color of from about 15 to about 17.

8. A process of claim 2 wherein the green coffee beans are roasted to a Hunter L-color of from about 14 to about 18.

9. The process of claim 2 wherein the coffee product provides a coffee beverage having a Titratable Acidity of from about 1.6 to about 3.0.

10. The process of claim 8 wherein the coffee product provides a coffee beverage having a Titratable Acidity of at least about 1.58.

11. The process of claim 9 wherein the coffee product provides a coffee beverage having a Titratable Acidity of from about 1.8 to about 2.7.

12. The process of claim 2 wherein the coffee product provides a coffee beverage having a brew absorbance of from about 1.3 to about 1.9.

13. The process of claim 2 wherein when the coffee product provides a coffee beverage having a Titratable Acidity in the range of from about 1.58 to about 2.2, the brew absorbance is equal to or greater than the value defined by the equation:

$$1.25+[0.625\times(2.2-TA)].$$

* * * * *